United States Patent
Yuasa et al.

(10) Patent No.: US 9,813,820 B2
(45) Date of Patent: *Nov. 7, 2017

(54) LOUDSPEAKER, ELECTRONIC APPARATUS USING SAME, AND MOBILE APPARATUS

(71) Applicant: Panasonic Intellectual Property Management Co., Ltd., Osaka (JP)

(72) Inventors: Takafumi Yuasa, Osaka (JP); Kenji Yamauchi, Mie (JP); Satoshi Takayama, Mie (JP); Koichi Nakayama, Okayama (JP); Ryo Kuribayashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/023,419

(22) PCT Filed: Feb. 23, 2015

(86) PCT No.: PCT/JP2015/000837
§ 371 (c)(1),
(2) Date: Mar. 21, 2016

(87) PCT Pub. No.: WO2015/129232
PCT Pub. Date: Sep. 3, 2015

(65) Prior Publication Data
US 2016/0286318 A1    Sep. 29, 2016

(30) Foreign Application Priority Data

Feb. 25, 2014    (JP) ................... 2014-033750

(51) Int. Cl.
*H04R 1/02*    (2006.01)
*H04R 9/06*    (2006.01)
(Continued)

(52) U.S. Cl.
CPC ............ *H04R 9/06* (2013.01); *F21V 33/0056* (2013.01); *H04R 1/028* (2013.01); *H04R 7/125* (2013.01);
(Continued)

(58) Field of Classification Search
CPC . H04R 9/06; H04R 7/22; H04R 1/028; H04R 2499/13; F21V 33/0056; G02B 6/002; G02B 6/0055; B60R 11/0217
See application file for complete search history.

(56) References Cited

U.S. PATENT DOCUMENTS

| 5,581,624 A | 12/1996 | Geisenberger et al. |
| 2007/0154057 A1 | 7/2007 | Takayama et al. |

(Continued)

FOREIGN PATENT DOCUMENTS

| EP | 1802167 A2 | 6/2007 |
| EP | 3113503 A1 | 1/2017 |

(Continued)

OTHER PUBLICATIONS

International Search Report of PCT application No. PCT/JP2015/000837 dated May 12, 2015.
(Continued)

*Primary Examiner* — Tuan D Nguyen
(74) *Attorney, Agent, or Firm* — McDermott Will & Emery LLP

(57) ABSTRACT

A loudspeaker includes a light-emitting element, a frame, a magnetic circuit provided with a magnetic gap, a diaphragm, a voice coil bobbin, and a voice coil. The diaphragm has an inner circumferential end including an end face facing the light-emitting element, and a light guide having a reflecting surface formed thereon and provided at a position where light enters from the end face. The first end of the voice coil bobbin is joined to the inner circumferential end of the
(Continued)

diaphragm, and the second end is inserted into the magnetic gap. The voice coil is wound around the second end of the voice coil bobbin. Light from the light-emitting element enters the end face of the diaphragm, is diffused by the light guide, and is reflected on the reflecting surface.

18 Claims, 14 Drawing Sheets

(51) Int. Cl.
  *F21V 33/00* (2006.01)
  *H04R 7/22* (2006.01)
  *H04R 7/12* (2006.01)
  *F21V 8/00* (2006.01)
(52) U.S. Cl.
  CPC ............... *H04R 7/22* (2013.01); *G02B 6/002* (2013.01); *G02B 6/0055* (2013.01); *H04R 2499/13* (2013.01)

(56) References Cited

U.S. PATENT DOCUMENTS

| | | | | |
|---|---|---|---|---|
| 2009/0010477 | A1* | 1/2009 | Frobisher | F21V 33/0056 381/386 |
| 2010/0316247 | A1* | 12/2010 | Ding | H04R 1/028 381/397 |
| 2011/0235845 | A1* | 9/2011 | Wang | H04R 1/26 381/386 |
| 2011/0277361 | A1 | 11/2011 | Nichol et al. | |
| 2013/0294639 | A1* | 11/2013 | Glei neir | H04R 1/028 381/397 |
| 2014/0192513 | A1* | 7/2014 | Yim | F21V 33/0056 362/86 |
| 2016/0084493 | A1* | 3/2016 | Salter | F21V 9/16 362/510 |

FOREIGN PATENT DOCUMENTS

| | | |
|---|---|---|
| FR | 2781971 A1 | 2/2000 |
| JP | 63-033414 Y | 9/1988 |
| JP | 1-175097 U | 12/1989 |
| JP | 2-103987 U | 8/1990 |
| JP | 6-245297 | 9/1994 |
| JP | 2004-007308 | 1/2004 |
| JP | 2005-303498 | 10/2005 |
| JP | 2007-174605 | 7/2007 |
| JP | 2008-252611 | 10/2008 |

OTHER PUBLICATIONS

The Extended European Search Report dated Mar. 1, 2017 for the related European Patent Application No. 15769087.6.
The Extended European Search Report dated Feb. 7, 2017 for the related European Patent Application No. 15754755.5.

\* cited by examiner

LOUDSPEAKER, ELECTRONIC APPARATUS USING SAME, AND MOBILE APPARATUS

TECHNICAL FIELD

The technical field relates to a loudspeaker having an illumination function, an electronic apparatus and a mobile apparatus including the loudspeaker.

BACKGROUND ART

In a conventional loudspeaker having an illumination function, a light source is disposed in front of the diaphragm, which reflects light from the light source, for example. Alternatively, a light source is disposed at the back of the diaphragm and the light from the light source transmits through the diaphragm.

As patent literature related to this patent application, patent literature 1 is known for example.

CITATION LIST

Patent Literature

PTL 1 Japanese Utility Model Examined Publication No. S63-33414

SUMMARY OF THE INVENTION

A loudspeaker of the present invention includes a light-emitting element, a frame, a magnetic circuit provided with a magnetic gap, a diaphragm, a voice coil bobbin, and a voice coil. The diaphragm includes an inner circumferential end having an end face facing the light-emitting element, and a light guide having a reflecting surface formed and provided at a position where light enters from the end face. The first end of the voice coil bobbin is joined to the inner circumferential end of the diaphragm, and the second end is inserted into the magnetic gap. The voice coil is wound around the second end of the voice coil bobbin.

Then, the light-emitting element is disposed facing the end face so as to let light enter the inside of the light guide from the end face.

With the above-described configuration, the light entering the end face of inner circumferential end from the light-emitting element diffuses while being reflected inside the diaphragm. Accordingly, light from the front of the diaphragm does not involve uneven brightness, and thus the diaphragm looks homogeneously illuminating, thereby providing illumination with high quality.

DESCRIPTION OF EMBODIMENT

Some problems in a conventional loudspeaker will be described prior to a description of a loudspeaker according to an embodiment.

In a conventional reflecting loudspeaker, when the light source is disposed in the center, a support body supporting the light source blocks light reflected from the diaphragm, causing uneven brightness. In the case where multiple light sources are disposed around the diaphragm, a sufficient distance from the light source to the diaphragm is not achieved, and thus variations in the distance from the light source to the diaphragm may cause uneven brightness.

In a conventional transmitting loudspeaker, even when multiple light sources are disposed in the back of the diaphragm, a sufficient distance from a light source to the diaphragm is not achieved, and thus variations in the distance from the light source to the diaphragm may cause uneven brightness.

The present invention provides a loudspeaker that suppresses uneven brightness to achieve illumination with high quality.

Hereinafter, a description is made of a loudspeaker according to the embodiment of the present invention with reference to the drawings.

Figure 1:
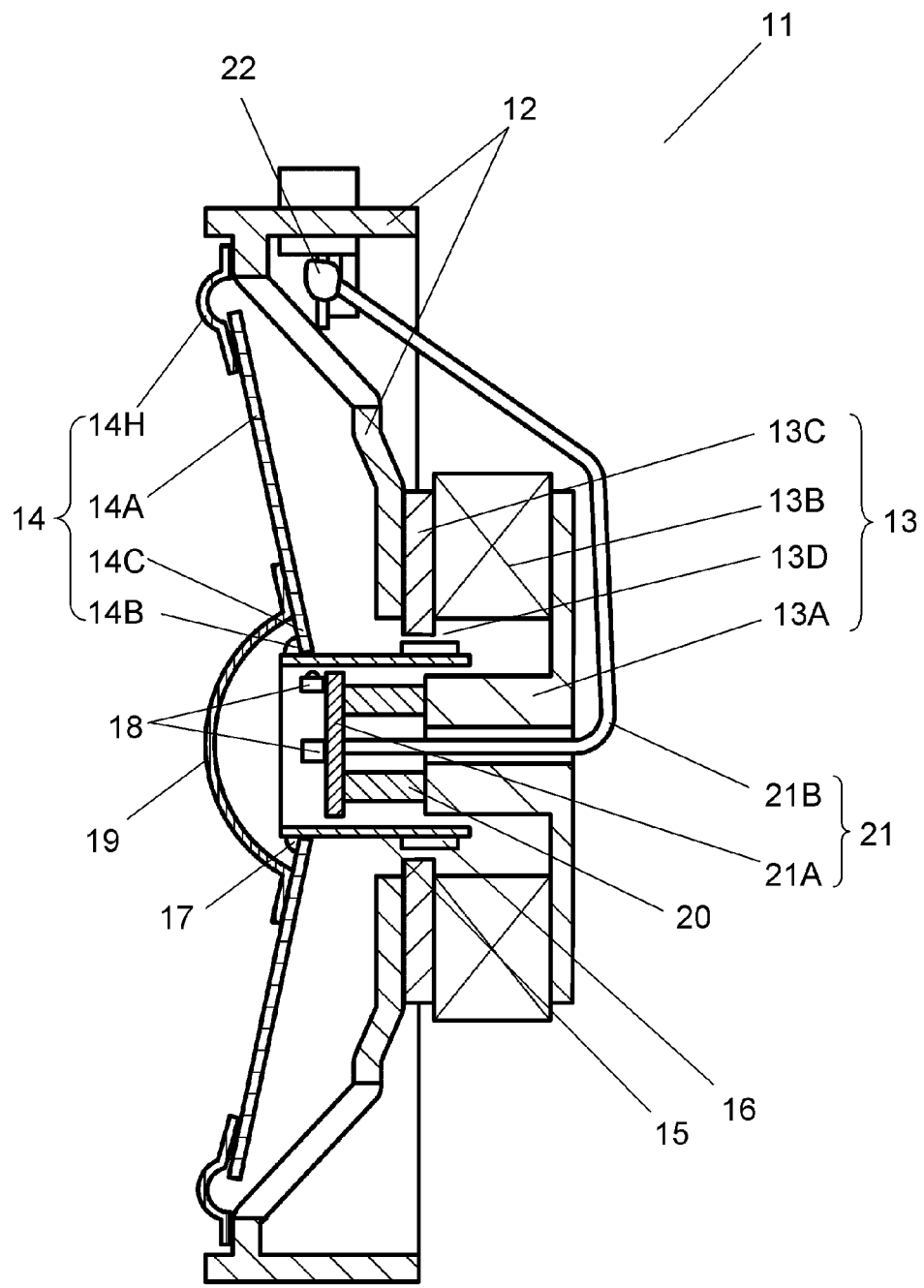
FIG. 1 is a sectional view of a loudspeaker according to an embodiment of the present invention.
Figure 2:
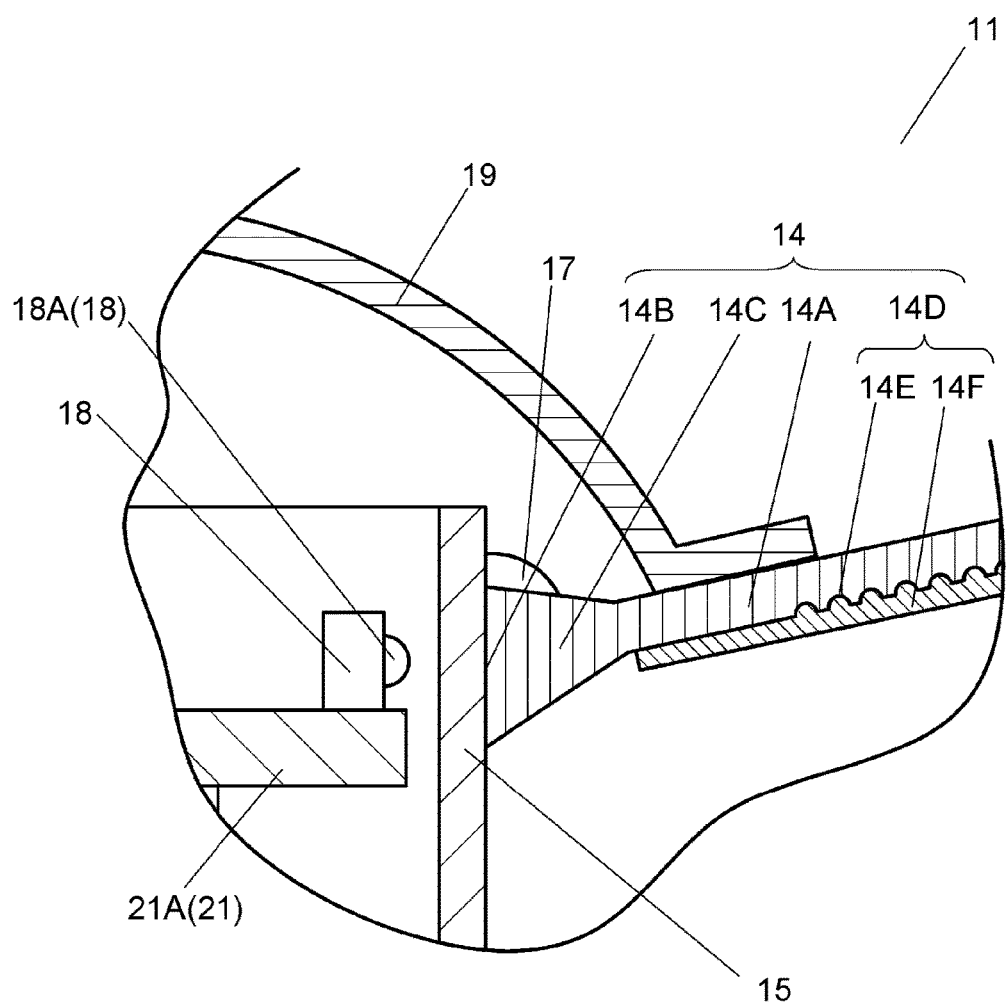
FIG. 2 is a sectional view of a substantial part of the loudspeaker shown in FIG. 1.

FIG. 1 is a sectional view of loudspeaker 11. FIG. 2 is a sectional view of a substantial part of loudspeaker 11. Loudspeaker 11 includes frame 12, magnetic circuit 13 provided with magnetic gap 13D, diaphragm 14, voice coil bobbin 15, voice coil 16, light-emitting diode (LED hereinafter) 18 as a light-emitting element, external terminal 22, and wiring part 21. Magnetic circuit 13 is joined to the central part of the back of frame 12.

The outer circumferential end of diaphragm 14 is connected to the outer circumference of frame 12. Diaphragm 14 is formed of a transmissive resin. Note that diaphragm 14 can be formed of a thermoplastic resin such as polycarbonate (PC) and acrylic resin. Accordingly, diaphragm 14 can be molded by injection molding that contributes to high productivity. Note that diaphragm 14 is cone-type; besides, it may be plane-type. Diaphragm 14 includes inner circumferential end 14C and plate-shaped light guide 14A. Inner circumferential end 14C is formed at the inner circumferential end of diaphragm 14. Further, diaphragm 14 has reflecting surface 14D. Reflecting surface 14D is formed in the back of diaphragm 14.

Diaphragm 14 includes edge 14H. Edge 14H is connected to the outer circumferential end of light guide 14A. The outer circumference of edge 14H is joined to the outer circumference of frame 12. In other words, light guide 14A is connected to the frame through edge 14H. Edge 14H is stuck to the front of diaphragm 14, and has a shape projecting toward the front of diaphragm 14.

Voice coil bobbin 15 has first and second ends. Voice coil 16 is wound around the second end. The first end of voice coil bobbin 15 is joined to end face 14B of diaphragm 14. End face 14B is shaped along the outer circumferential surface of voice coil bobbin 15 and is joined with the outer circumferential surface in a close contact manner. Meanwhile, the second end is inserted into magnetic gap 13D.

LED 18 is disposed at a position facing end face 14B inside voice coil bobbin 15. Note that the light-emitting surface of LED 18 faces end face 14B. With this configuration, light output from LED 18 enters end face 14B and is guided to light guide 14A through inner circumferential end 14C. Meanwhile, it is only required that inner circumferential end 14C and end face 14B are formed at a position facing at least LED 18. Needless to say, inner circumferential end 14C and end face 14B may be formed on the entire circumference inside diaphragm 14. Note that LED 18 may be of a full-color type; besides, it may be of a monochromatic type. Instead of an LED, another type of light-emitting element such as an electroluminescence (EL) element may be used.

External terminal 22 is attached to frame 12. Wiring part 21 electrically connects external terminal 22 with LED 18.

Note that wiring part 21 may include lead wire 21B. Further, wiring part 21 may include printed circuit board 21A. In this case, LED 18 is attached to printed circuit board 21A with solder or the like. Wiring part 21 may include printed circuit board 21A and lead wire 21B. In this case, printed circuit board 21A is electrically connected to external terminal 22 through lead wire 21B. These configurations allow LED 18 to be driven on the basis of a signal input to external terminal 22.

With the above-described configuration, light entering end face 14B of inner circumferential end 14C of diaphragm 14 is reflected repeatedly inside diaphragm 14 while diffusing toward the outer circumference. Further, in light guide 14A, the light is reflected toward the front by reflecting surface 14D provided on the back. Hence, uniformized light is discharged from the front of diaphragm 14.

Next, a more detailed description is made of loudspeaker 11 according to the embodiment. First, diaphragm 14 is described. As shown in FIG. 2, reflecting surface 14D can be formed by providing plate-shaped projection 14E on the back of light guide 14A, for example. In this case, plate-shaped projection 14E can be molded simultaneously when forming diaphragm 14, which contributes to high productivity of diaphragm 14.

Alternatively, reflecting surface 14D may be formed by providing resin coating film 14F that reflects light, on the back of diaphragm 14. In this case, resin coating film 14F may contain a reinforcing material, thereby increasing the elastic modulus of diaphragm 14. As the reinforcing material, plant opal or nanofiber extracted from bamboo or the like can be used, thereby increasing the elastic modulus as well as the binding property (strength) between the resin of resin coating film 14F and the reinforcing material.

Note that inner circumferential end 14C is preferably made thicker than light guide 14A. This configuration further increases the efficiency of light entering light guide 14A. In this case, inner circumferential end 14C is preferably made gradually thinner from end face 14B toward light guide 14A. This configuration increases the efficiency of light entering light guide 14A. In this case, inner circumferential end 14C and end face 14B are preferably formed only at a position facing LED 18. This configuration prevents the weight of diaphragm 14 from increasing, which raises the sound pressure level of loudspeaker 11 as well as the high threshold frequency of loudspeaker 11.

Voice coil bobbin 15 is cylindrical. Then, LED 18 is disposed inside voice coil bobbin 15. This configuration allows light emitted by LED 18 to enter end face 14B through voice coil bobbin 15. Meanwhile, end face 14B may be in contact with the outer circumferential surface of voice coil bobbin 15. This configuration decreases the gap between end face 14B that light enters and the outer circumferential surface of voice coil bobbin 15, thereby increasing the efficiency of light passed through voice coil bobbin 15 entering end face 14B.

Note that diaphragm 14 and voice coil bobbin 15 are joined to each other through bonding part 17. Bonding part 17 is formed of a hardened adhesive, for example. Bonding part 17 can be formed between the outer circumferential surface of voice coil bobbin 15 and the front of diaphragm 14. Besides, bonding part 17 may be formed between the outer circumferential surface of voice coil bobbin 15 and the back of diaphragm 14, for instance.

Note that bonding part 17 may be provided at a position excluding end face 14B of inner circumferential end 14C. This configuration prevents the adhesive from attaching to end face 14B. Hence, scattering of light which may be caused by an uneven surface formed by the adhesive on the front of end face 14B is suppressed. In this case, inner circumferential end 14C is preferably made thicker than light guide 14A. With this configuration, a level difference (step) is formed between the part of light guide 14A where the adhesive is applied and inner circumferential end 14C, thereby preventing the adhesive from attaching to end face 14B.

Inner circumferential end 14C may be formed on the entire circumference inside diaphragm 14. When diaphragm 14 is incorporated into frame 12, this configuration dispenses with consideration of the orientation of diaphragm 14, thereby reducing worker hours for assembling diaphragm 14. In this case, bonding part 17 is preferably formed at a part of inner circumferential end 14C, excluding the area of the light path, thereby preventing the adhesive from attaching to end face 14B.

Printed circuit board 21A on which LED 18 is mounted is accommodated inside voice coil 16. Then, LED 18 is disposed so as to emit light toward end face 14B of diaphragm 14. In this case, LED 18 is preferably of a side surface emission type. This configuration increases the efficiency of light entering light guide 14A. Besides, LED 18 may include light collection lens 18A on its light-emission surface. This configuration increases the efficiency of light entering light guide 14A further. As LED 18, a wide range light distribution type can be used as well.

As described above, voice coil bobbin 15 lies between LED 18 and end face 14B, and thus light emitted by LED 18 enters end face 14B through voice coil bobbin 15. Hence, the region of voice coil bobbin 15 through which light from LED 18 transmits is preferably transmissive. Further, the region of voice coil bobbin 15 through which light from LED 18 transmits is preferably colorless. This configuration suppresses the decrease of light amount caused by light from LED 18 passing through voice coil bobbin 15, thereby enhancing the brightness of diaphragm 14.

Under such a circumstance, a transparent material is used for the region of voice coil bobbin 15 through which the light from LED 18 transmits. In this case, inner circumferential end 14C is preferably formed along the outer circumferential surface of voice coil bobbin 15. Further, end face 14B is preferably in contact with the outer circumferential surface of voice coil bobbin 15. This configuration decreases the gap between end face 14B that light enters and the outer circumferential surface of voice coil bobbin 15, thereby increasing the efficiency of light passed through voice coil bobbin 15 entering end face 14B.

Note that entire voice coil bobbin 15 may be formed of a transmissive material. In this case, voice coil bobbin 15 can be formed of a transmissive resin. This configuration increases the productivity of voice coil bobbin 15.

Figure 3:
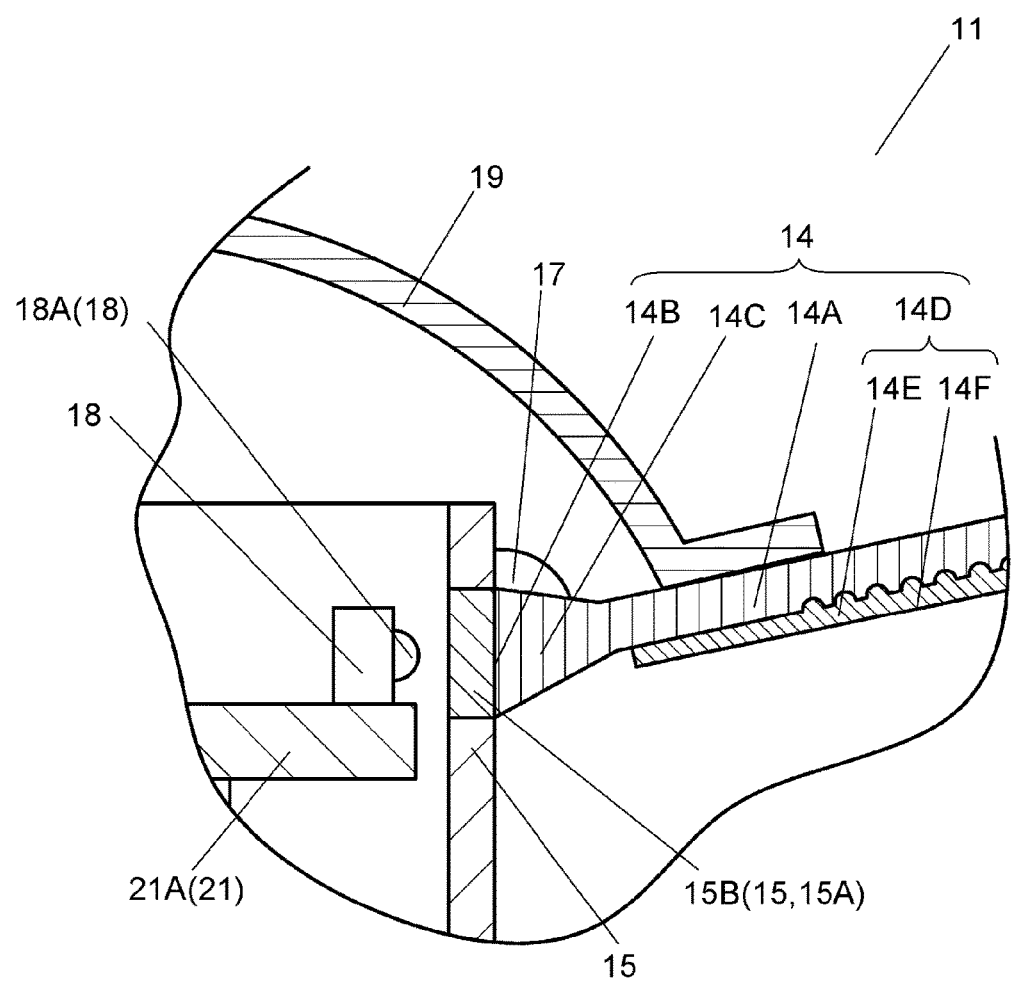
FIG. 3 is a sectional view of a substantial part of a loudspeaker according to the embodiment of the present invention, in a case where a voice coil bobbin provided with a light inlet window is used.

FIG. 3 is a sectional view of a substantial part of loudspeaker 11, in a case where voice coil bobbin 15 with light inlet window 15A is used. The circumferential surface of voice coil bobbin 15 has light inlet window 15A formed therein. Light inlet window 15A is disposed at a position facing end face 14B to allow light to enter end face 14B. Alternatively, light inlet window 15A may be formed by inserting transmissive material 15B only into a part facing end face 14B in the circumferential surface of voice coil bobbin 15. In this case, a transmissive resin or glass for instance can be used as transmissive material 15B.

In FIGS. 2 and 3, inner circumferential end 14C may be formed on the entire circumference inside diaphragm 14. This configuration reduces worker hours for assembling diaphragm 14 when diaphragm 14 is joined to frame 12.

Figure 4:
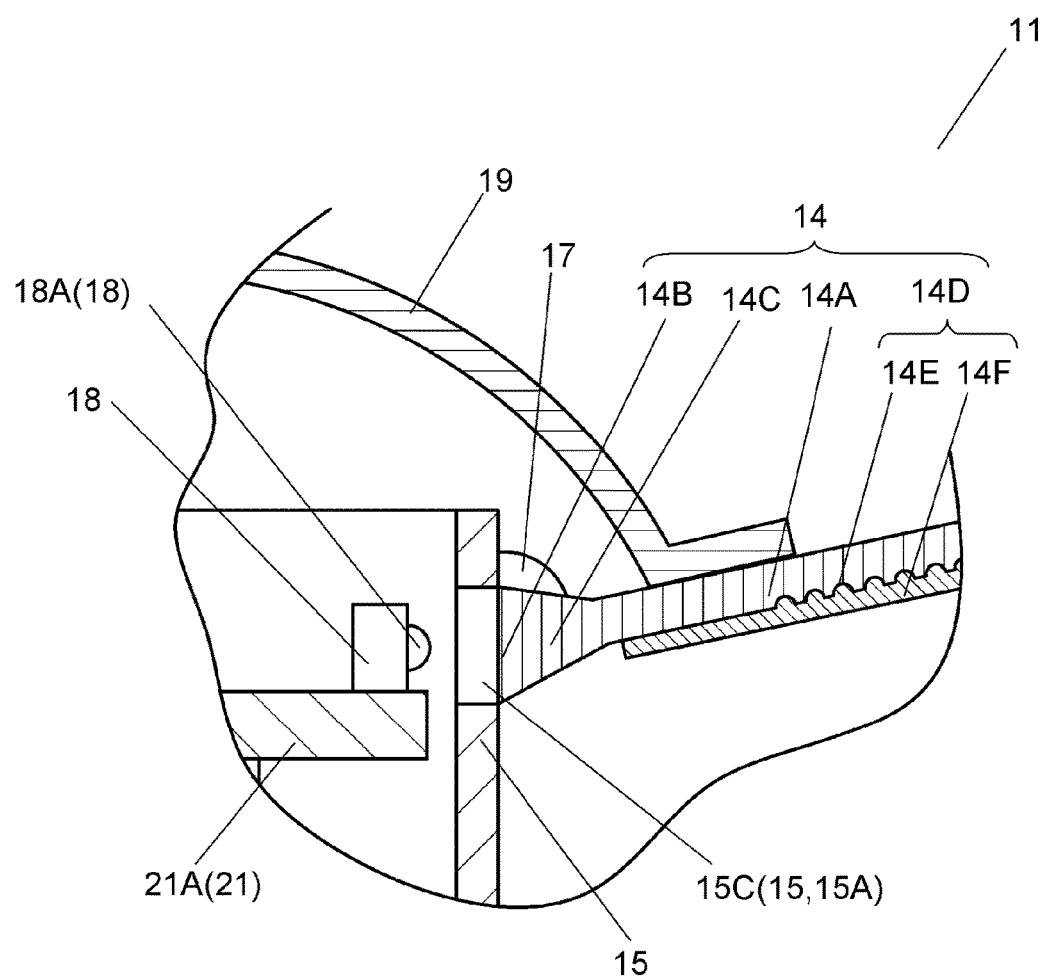
FIG. 4 is a sectional view of a substantial part of a loudspeaker according to the embodiment of the present invention, in a case where a voice coil bobbin provided with another light inlet window is used.

FIG. 4 is a sectional view of a substantial part of loudspeaker 11, in a case where voice coil bobbin 15 provided with through hole 15C is used. Light inlet window 15A may be through hole 15C formed by penetrating voice coil bobbin 15. Through hole 15C is provided in a part of voice coil bobbin 15 facing LED 18.

In FIGS. 3 and 4, voice coil bobbin 15 is formed with light inlet window 15A therein, thus it is not required for voice coil bobbin 15 to allow light to pass through a part other than inlet window 15A. This allows voice coil bobbin 15 to be formed of an inexpensive, lightweight material such as paper.

Figure 5:
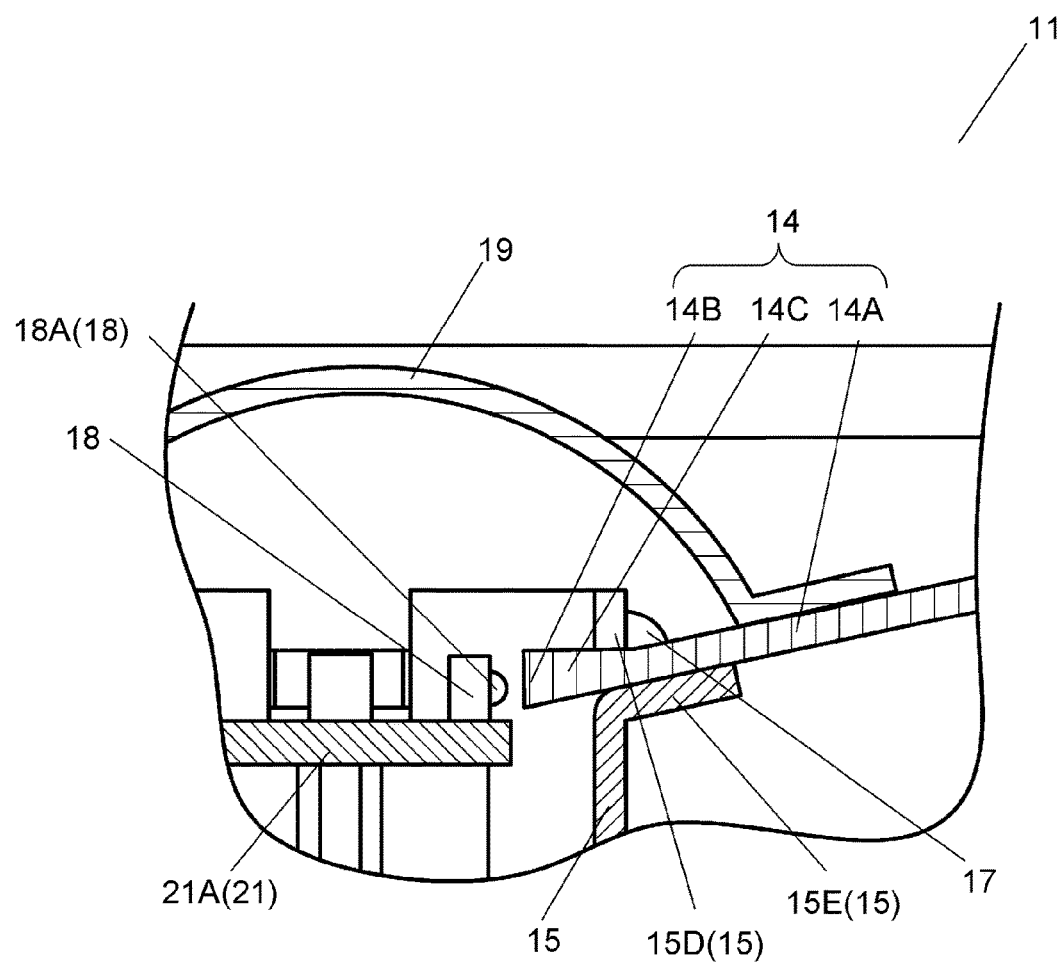
FIG. 5 is a sectional view of a substantial part of a loudspeaker according to the embodiment of the present invention, in a case where a voice coil bobbin provided with a cutout is used.

FIG. 5 is a sectional view of a substantial part of loudspeaker 11, in a case where voice coil bobbin 15 provided with cutout 15D is used. Cutout 15D is formed at a position facing LED 18, of the first end of voice coil bobbin 15. In this case, inner circumferential end 14C preferably projects toward the inside of voice coil bobbin 15. That is, inner circumferential end 14C is disposed at a position projecting from the inner circumferential surface of voice coil bobbin 15. Here, bonding part 17 may be formed between the inner circumferential surface of voice coil bobbin 15 and the back of diaphragm 14. Alternatively, bonding part 17 may be formed between the inner circumferential surface of voice coil bobbin 15 and the front of diaphragm 14. Meanwhile, inner circumferential end 14C may be structured so as to project not only from the inner circumferential surface of voice coil bobbin 15 but also up to the inner circumferential surface of voice coil bobbin 15. Alternatively, inner circumferential end 14C may be disposed outside cutout 15D.

Further, cutout 15D may be provided with bending part 15E that is a part of the first end of voice coil bobbin 15 bent along the back of diaphragm 14. In this configuration, when voice coil bobbin 15 is formed of a light reflective material, bending part 15E reflects light output from LED 18, thereby efficiently guiding the light to light guide 14A. Bending part 15E and diaphragm 14 are preferably joined to each other with an adhesive, for instance. This configuration increases the joining strength of voice coil bobbin 15 and diaphragm 14. Note that bending part 15E may be bent not only to the outside but also to the inside, of voice coil bobbin 15.

Figure 6:
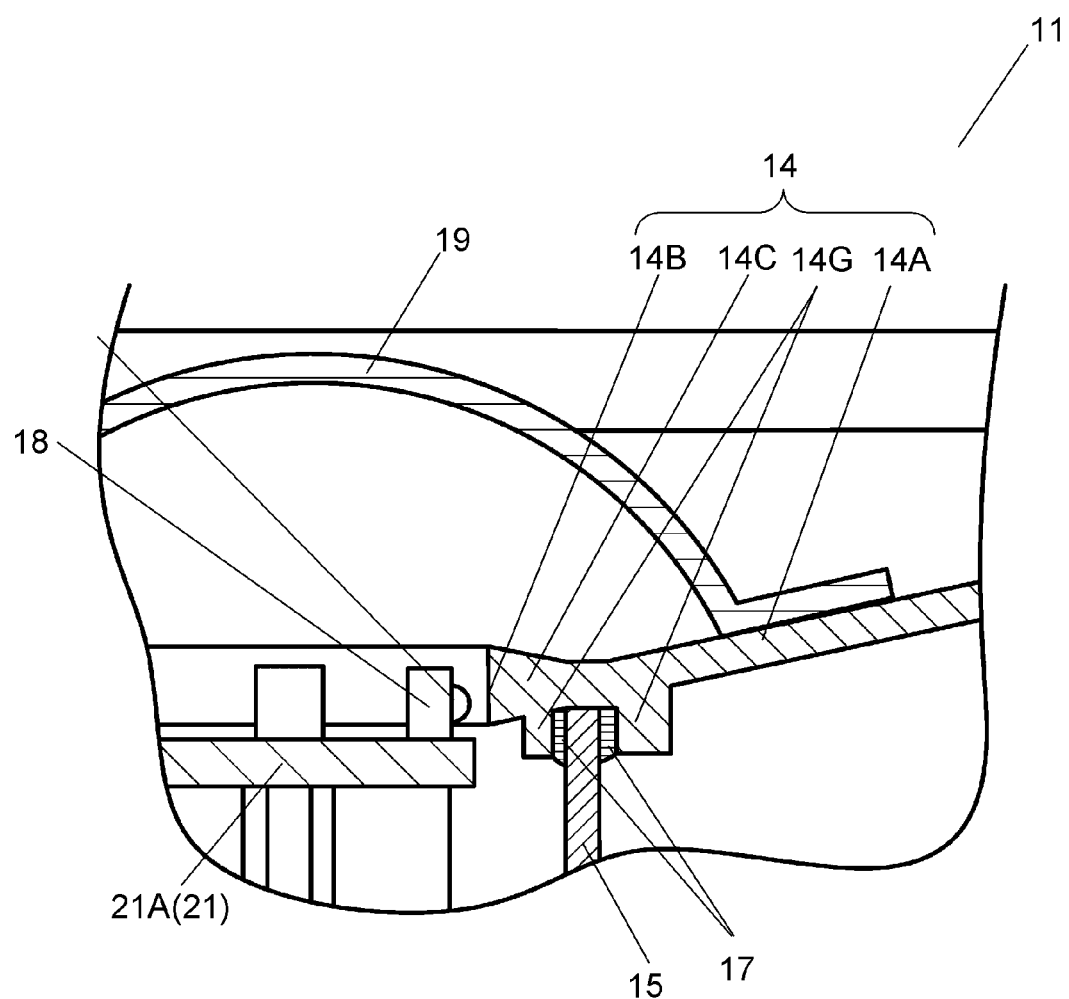
FIG. 6 is a sectional view of a substantial part of a loudspeaker according to the embodiment of the present invention, in a case where a voice coil bobbin is joined to the back of the diaphragm.

FIG. 6 is a sectional view of a substantial part of loudspeaker 11, in a case where voice coil bobbin 15 is joined to the back of diaphragm 14. As bonding part 17 is formed between the first end of voice coil bobbin 15 and the back of diaphragm 14, the first end of voice coil bobbin 15 is joined to the back of diaphragm 14. With this configuration, the entirety of inner circumferential end 14C can project from the inner circumferential surface of voice coil bobbin 15. In this case, inner circumferential end 14C is preferably formed on the entire circumference inside diaphragm 14.

Further, projections 14G may be provided on the back of diaphragm 14. In this case, bonding part 17 is preferably formed between the side surface near the first end of voice coil bobbin 15 and the side surfaces of projections 14G. Here, projection 14G may be provided on only one of the inner circumferential surface and the outer circumferential surface, close to the first end of voice coil bobbin 15. These configurations increase the joining strength of voice coil bobbin 15 and diaphragm 14.

As shown in FIGS. 5 and 6, inner circumferential end 14C can project from the inner circumferential surface of voice coil bobbin 15, and thus end face 14B can be positioned close to LED 18. Therefore, the efficiency of light from LED 18 entering end face 14B is increased. Further, light output from LED 18 does not pass through voice coil bobbin 15, but directly enters end face 14B, thereby increasing the efficiency of light entering end face 14B. In addition, bonding part 17 and end face 14B are disposed separately from each other, thereby preventing the adhesive from attaching to end face 14B.

Figure 7:
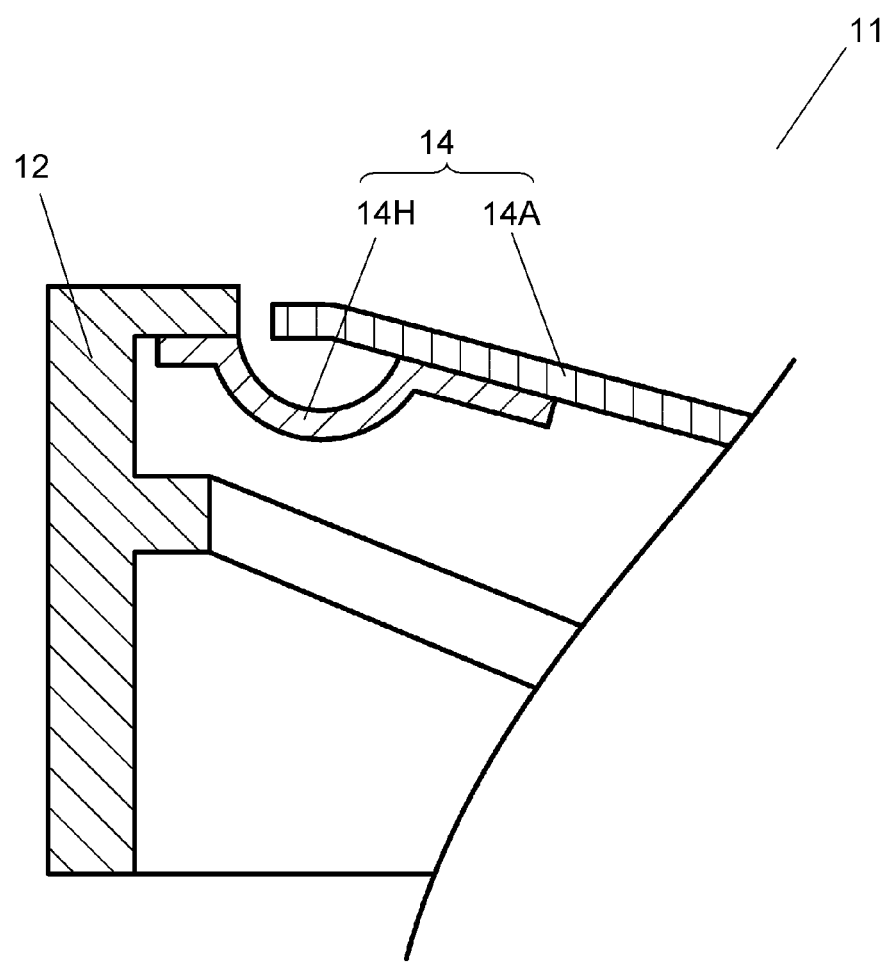
FIG. 7 is a sectional view of a substantial part of a loudspeaker according to the embodiment of the present invention, in a case where an edge is connected to the back of the diaphragm.

FIG. 7 is a sectional view of a substantial part of the loudspeaker, in a case where edge 14H is connected to the back of diaphragm 14. In this case, edge 14H is preferably connected so as to project toward the back of diaphragm 14. This configuration allows light guide 14A to further extend toward the outer circumference beyond the joint portion with edge 14H. In other words, the outer circumference of light guide 14A masks a part of edge 14H, thereby enlarging the light-emission area size of diaphragm 14.

Note that, as shown in FIG. 1, magnetic circuit 13 is preferably of an external magnet type. Magnetic circuit 13 of an external magnet type includes yoke 13A, magnet 13B, and plate 13C. Yoke 13A is provided with a pole piece in its center. In this case, the pole piece of yoke 13A is preferably provided with a through hole for passing lead wire 21B therethrough. Yoke 13A is formed of a magnetic material such as iron. Therefore, the through hole can be easily formed in the pole piece when producing yoke 13A.

Magnetic circuit 13 may be of, besides an external magnet type, an internal magnet type. In this case, printed circuit board 21A is disposed above magnet 13B. However, it is difficult to perforate magnet 13B. Hence, with magnetic circuit 13 of an internal magnet type, voice coil bobbin 15 is perforated for drawing out lead wire 21B.

In a case where a gap exists between the front of magnetic circuit 13 and printed circuit board 21A, spacer 20 is preferably provided between the front of magnetic circuit 13 and printed circuit board 21A. For magnetic circuit 13 of an external magnet type, spacer 20 is placed on the pole piece of yoke 13A.

Further, loudspeaker 11 preferably includes dust cap 19. Dust cap 19 is provided in the center of diaphragm 14, and dust cap 19 preferably projects toward the front of diaphragm 14. With this configuration, a space is formed between dust cap 19 and magnetic circuit 13, and LED 18 can be accommodated in this space. Dust cap 19 is preferably in a color with low light transmission, such as black. This configuration suppresses light from LED 18 directly leaking from dust cap 19. Hence, mainly light guide 14A of loudspeaker 11 emits light, thus diaphragm 14 can be decorated with beautiful illumination free from uneven light emission.

Further, as input for driving LED 18, an audio signal for driving loudspeaker 11 is preferably used. This configuration allows light to blink correspondingly to the sound strength. Further, in a case where LED 18 is of a full color type, the emission color of diaphragm 14 can be changed in synchronization with sound. Note that input for driving LED 18 is not limited to an audio signal for driving loudspeaker 11, but may be an independent input signal.

Figure 8:
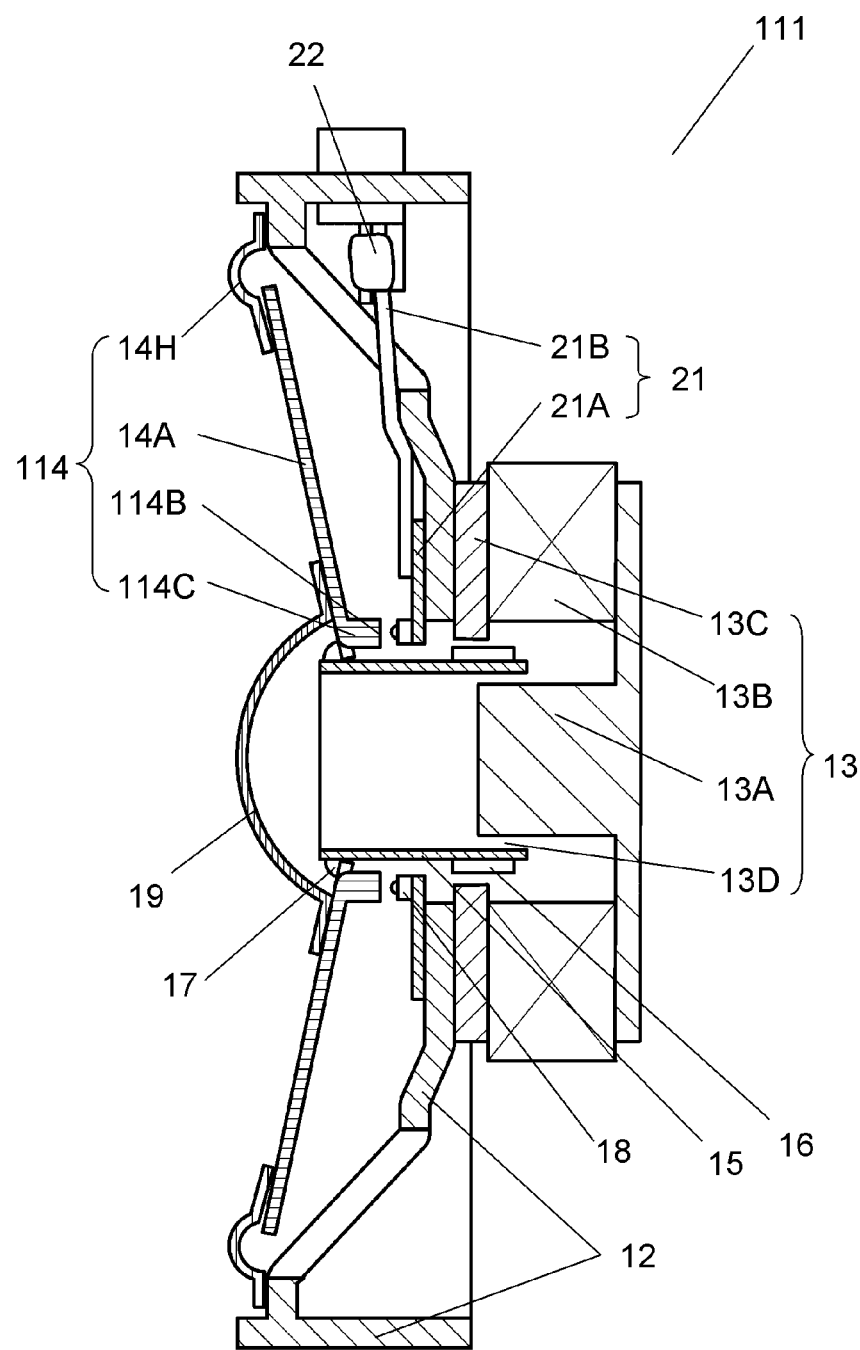
FIG. 8 is a sectional view of a substantial part of a loudspeaker according to the embodiment of the present invention, in a case where a diaphragm having a bent inner circumferential end is used.

FIG. 8 is a sectional view of loudspeaker 111, in a case where diaphragm 114 is used instead of diaphragm 14 shown in FIG. 1. Inner circumferential end 114C of diaphragm 114 is bent. LED 18 outputs light toward the back of diaphragm 114. That is, in loudspeaker 111, LED 18 outputs light in a direction different from that with loudspeaker 11 shown in FIG. 1.

Inner circumferential end 114C of diaphragm 114 is bent toward the position where LED 18 is disposed, along the outer circumferential surface of voice coil bobbin 15. LED 18 is disposed at the back of diaphragm 114. Inner circumferential end 114C is disposed so as to be positioned in front of LED 18. Hence, LED 18 is preferably of a top surface emission type. Consequently, end face 114B of inner circumferential end 114C faces the light emitting part of LED 18. Then, light emitted form LED 18 enters diaphragm 114 through end face 114B. With this configuration, even while voice coil bobbin 15 or diaphragm 114 is vibrating, end face 114B always maintains the state to face LED 18. Hence, even while loudspeaker 111 is being driven, light output from the LED efficiently enters end face 114B.

Printed circuit board 21A is disposed in front of the central part of frame 12. Meanwhile, magnetic circuit 13 may be of either an external magnet type or an internal magnet type. In a case where magnetic circuit 13 is of an external magnet type, printed circuit board 21A may be mounted to the front surface of the central part of plate 13C.

Inner circumferential end 114C is preferably formed such that a gap exists between the side surface inside inner circumferential end 114C and the outer circumferential surface of voice coil bobbin 15. This configuration prevents the adhesive of bonding part 17 from attaching to end face 114B. Further, the distance between LED 18 and voice coil bobbin 15 can be made longer, as well as the distance between the end of printed circuit board 21A and voice coil bobbin 15. This configuration, even if voice coil bobbin 15 rolls, prevents voice coil bobbin 15 and LED 18 from contacting each other.

Figure 9:
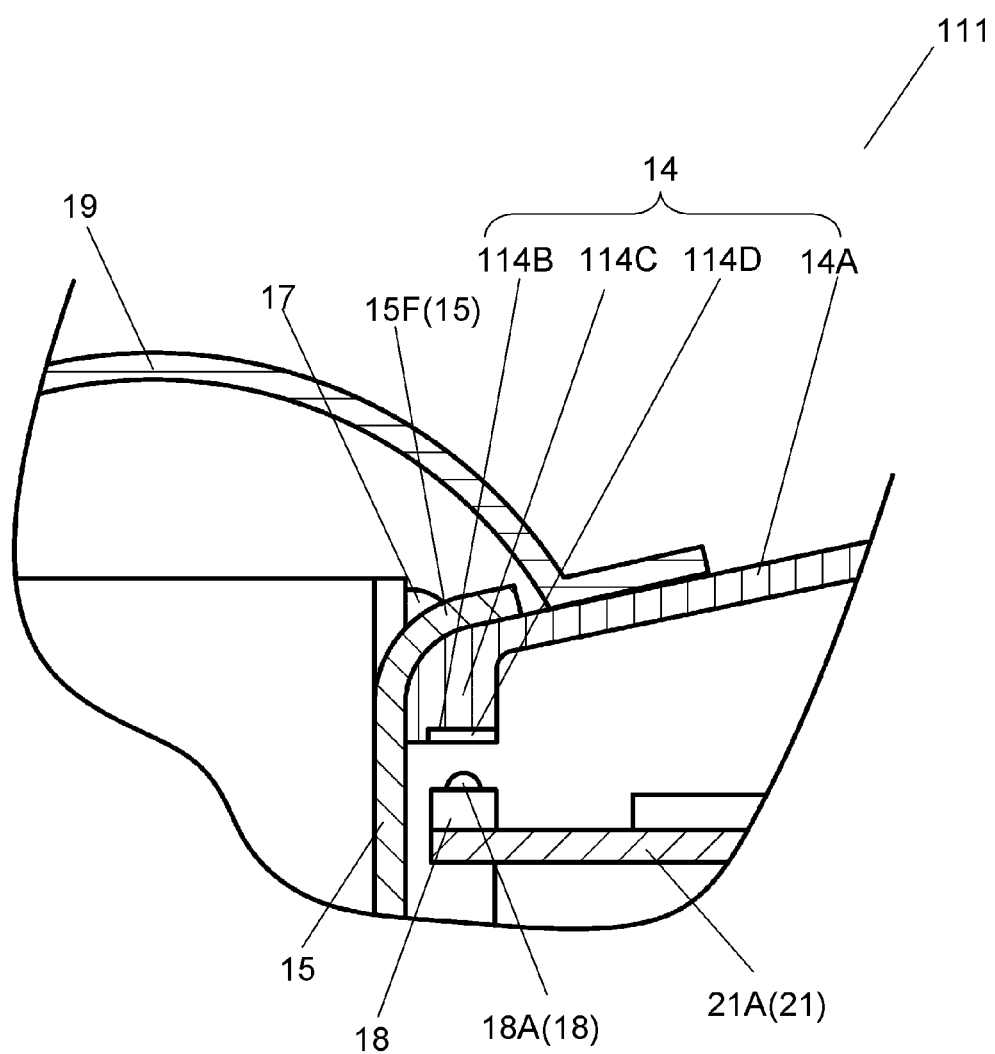
FIG. 9 is a sectional view of a substantial part of a loudspeaker according to the embodiment of the present invention, in a case where the bent inner circumferential end is joined with the voice coil bobbin.

FIG. 9 is a sectional view of a substantial part of the loudspeaker, in a case where bent inner circumferential end 114C and voice coil bobbin 15 are joined together. The side surface of inner circumferential end 114C is in contact with the outer circumferential surface of voice coil bobbin 15. Then, inner circumferential end 114C and voice coil bobbin 15 are joined together. In this case, bonding the side surface of inner circumferential end 114C and the outer circumferential surface of voice coil bobbin 15 together increases the joining strength of diaphragm 114 and voice coil bobbin 15.

The first end of voice coil bobbin 15 is preferably provided with bending part 15F that bends outward along the front surface of diaphragm 14. This configuration allows the first end of voice coil bobbin 15 to reflect light, and thus light from LED 18 can be guided to light guide 14A further efficiently.

In this case, voice coil bobbin 15 is preferably formed of a light reflective material. This configuration allows light from LED 18 to be efficiently guided to light guide 14A.

Bending part 15F at the first end of voice coil bobbin 15 is preferably bonded with the front surface of diaphragm 114. This configuration increases the joining strength of diaphragm 114 and voice coil bobbin 15.

Figure 10:
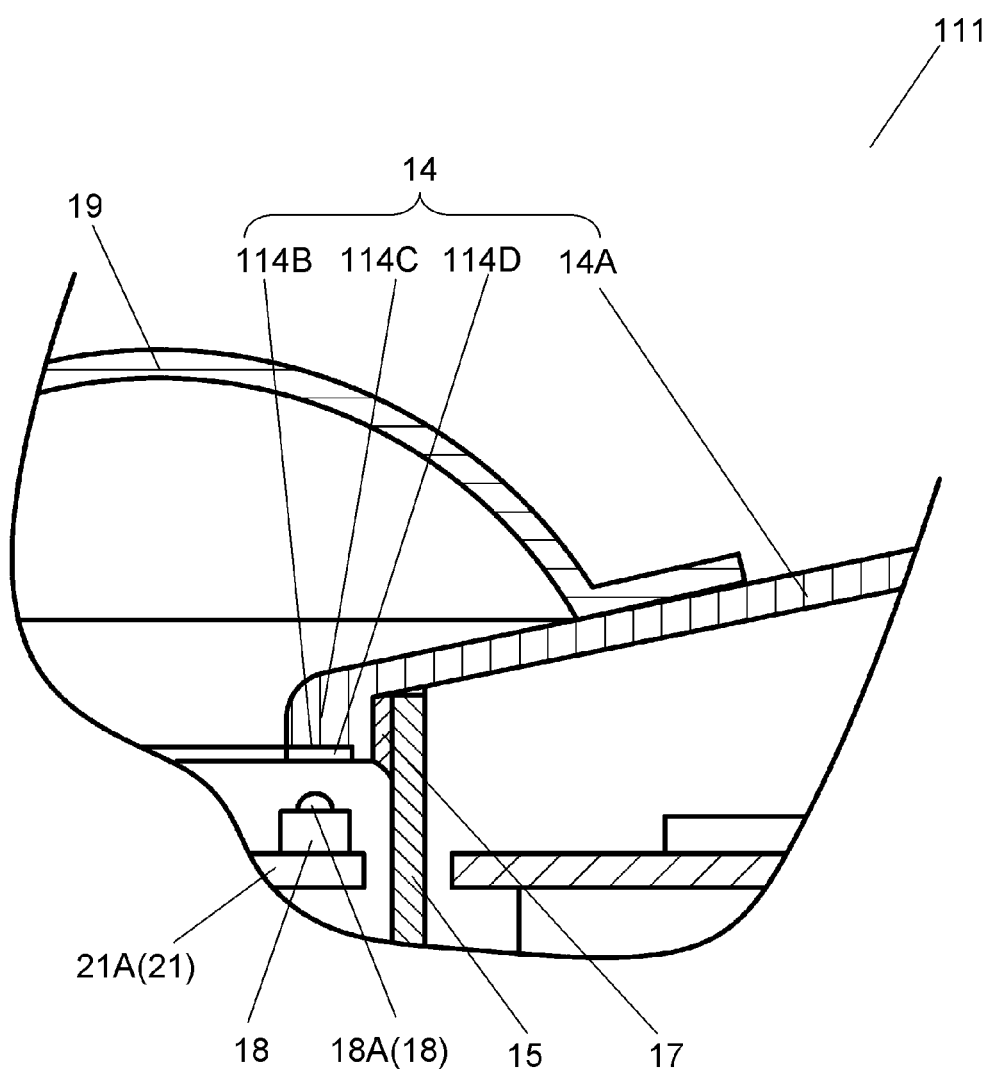
FIG. 10 is a sectional view of a substantial part of a loudspeaker according to the embodiment of the present invention, in a case where the bent inner circumferential end is disposed inside the voice coil bobbin.

FIG. 10 is a sectional view of a substantial part of loudspeaker 111, in a case where bent inner circumferential end 114C is disposed inside voice coil bobbin 15. Alternatively, inner circumferential end 114C may be bent along the inner circumferential surface of voice coil bobbin 15. In addition, the outer side surface of inner circumferential end 114C and the inner circumferential surface of voice coil bobbin 15 are preferably joined together. In this case, LED 18 and printed circuit board 21A are disposed inside voice coil bobbin 15.

In loudspeaker 111 shown in each of FIGS. 9 and 10, the bottom surface of inner circumferential end 114C is preferably provided with recess 114D. Recess 114D is formed at a position that light from LED 18 enters. This configuration prevents the adhesive of bonding part 17 from attaching to end face 114B.

In loudspeaker 111 shown in each of FIGS. 8 through 10, inner circumferential end 114C is preferably made thicker than light guide 14A. This configuration increases the efficiency of light output from LED 18 entering light guide 14A, and further increases the joining strength of diaphragm 114 and voice coil bobbin 15. Inner circumferential end 114C may be formed continuously around the back surface of diaphragm 114 along the outer circumferential surface of voice coil bobbin 15. This configuration further increases the joining strength of diaphragm 114 and voice coil bobbin 15. In this case, however, inner circumferential end 114C and voice coil bobbin 15 are preferably bonded together, excluding the region positioned in front of LED 18, of inner circumferential end 114C. This configuration prevents an adhesive from attaching to end face 114B. Alternatively, inner circumferential end 114C may be disposed only in front of LED 18. This configuration reduces the weight of diaphragm 114. Further, inner circumferential end 114C is preferably disposed at a position hidden by dust cap 19.

Figure 11:
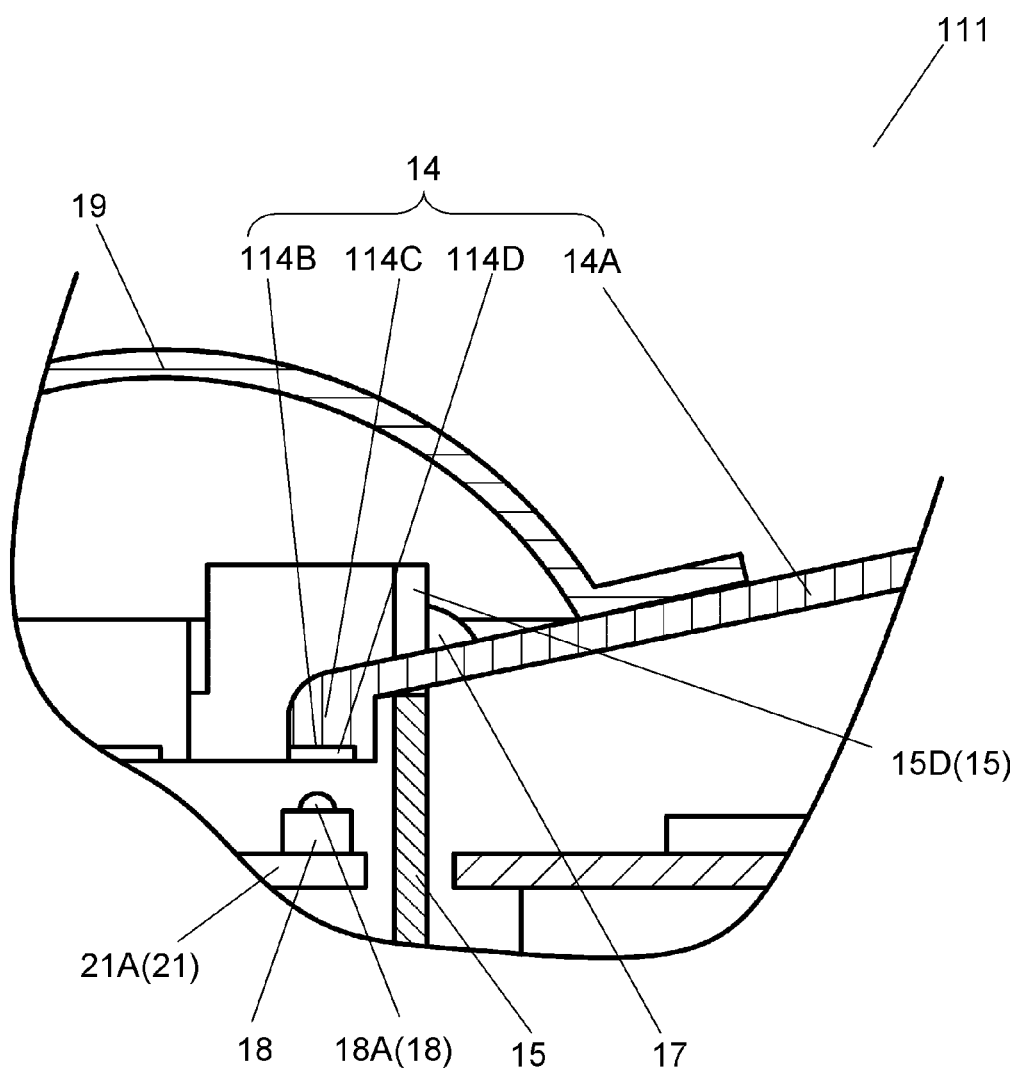
FIG. 11 is a sectional view of a substantial part of a loudspeaker according to the embodiment of the present invention, in a case where the bent inner circumferential end is disposed inside the voice coil bobbin provided with a cutout.

FIG. 11 is a sectional view of a substantial part of loudspeaker 111, in a case where inner circumferential end 114C is disposed inside voice coil bobbin 15 provided with cutout 15D. In other words, inner circumferential end 114C is provided instead of inner circumferential end 14C shown in FIG. 5. Note that, in this case as well, LED 18 emits light toward end face 114B.

Figure 12:
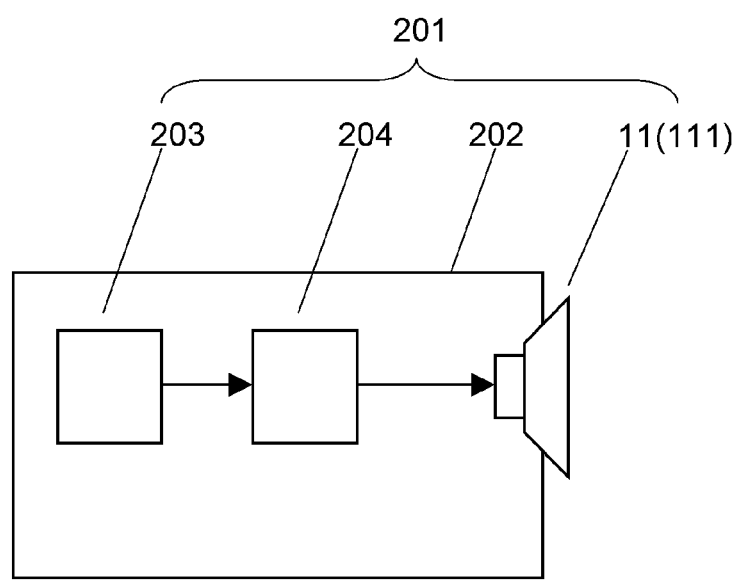
FIG. 12 is a conceptual diagram of an electronic apparatus according to the embodiment of the present invention.

FIG. 12 is a circuit block diagram of electronic apparatus 201, which is an amusement machine such as a pachinko, pachinko-slot, and slot machine, for example. Otherwise, electronic apparatus 201 may be an audio device such as a mini-component stereophonic apparatus and radio-cassette player/recorder, or a game apparatus that produces sound.

Electronic apparatus 201 includes sound source unit 203, audio processor 204, and loudspeaker 11. Sound source unit 203 and audio processor 204 are accommodated in housing 202. Loudspeaker 11 is attached to housing 202.

Sound source unit 203 is electrically connected to audio processor 204. Sound source unit 203 reads a sound source signal from the sound source (not shown) and outputs the signal to audio processor 204. The sound source stores sound source signals. Examples of the sound source include a CD (compact disc), DVD (digital versatile disk), record, cassette tape, and various types of memory.

The output end of audio processor 204 is electrically connected to external terminal 22 of loudspeaker 11. Audio processor 204 includes at least an amplifier to amplify sound source signals. Note that audio processor 204 may further include a digital/analog (D/A) converter, for example.

With the above-described configuration, viewers can enjoy sound as well as illumination produced from beautiful light patterns and images.

Figure 13:
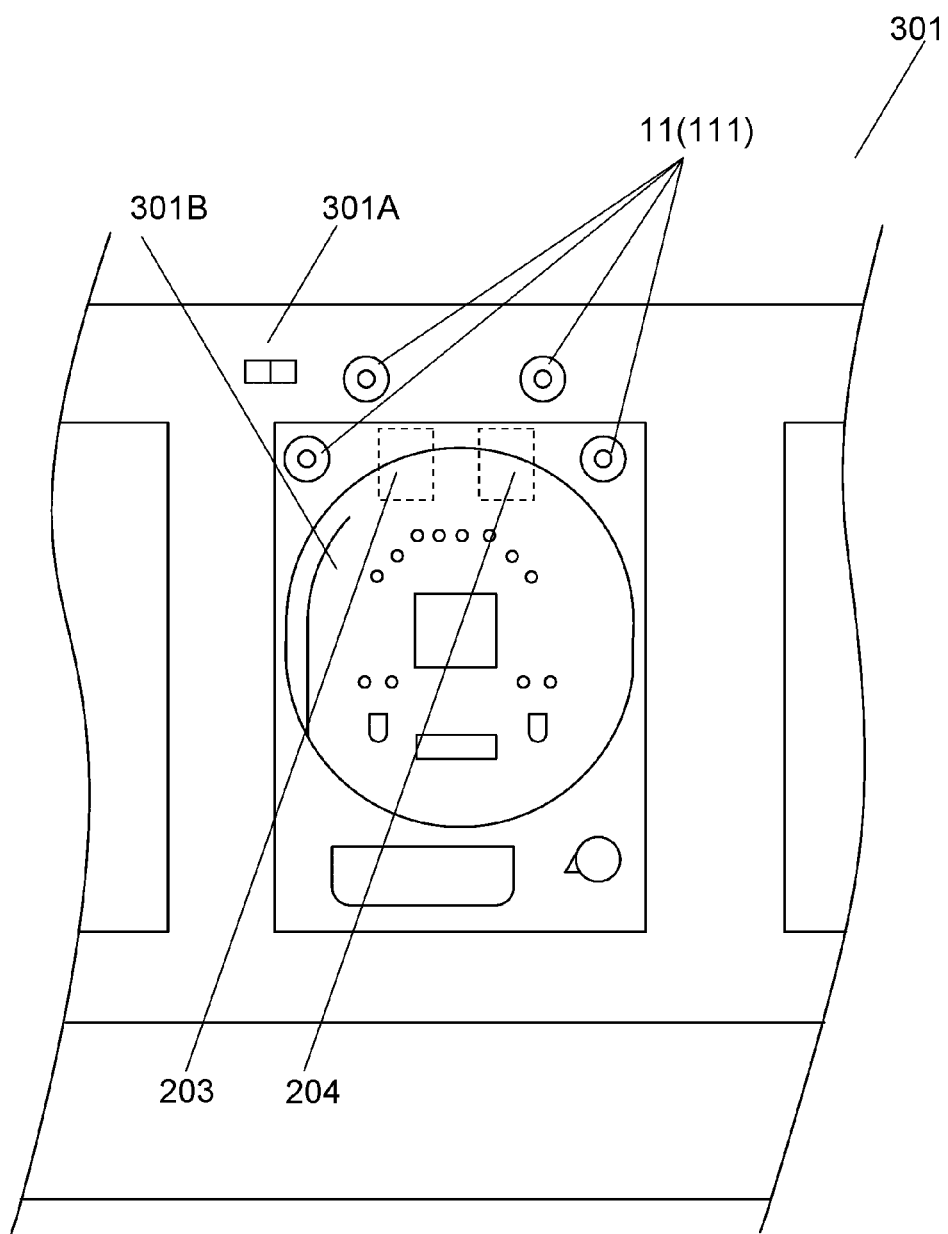
FIG. 13 is a conceptual diagram of another electronic apparatus according to the embodiment of the present invention.

FIG. 13 is a conceptual diagram of electronic apparatus 301. Electronic apparatus 301 includes body 301A, game boards 301B, sound source unit 203, audio processor 204, and loudspeaker 11. Body 301A has multiple game boards 301B incorporated therein. Each of game boards 301B contains sound source unit 203, audio processor 204, and loudspeaker 11. Further, loudspeaker 11 may be provided also in body 301A. Loudspeaker 11 outputs sound and light in response to output from audio processor 204.

With this configuration, a player can enjoy sound output from game board 301B as well as illumination produced by loudspeaker 11 while playing. Thus, the player can further enjoy playing on game board 301B.

Note that body 301A has a switch (not shown) for a player to inform a hall staff of abnormal conditions of the machine. Hence, loudspeaker 11 provided in body 301A may be configured to emit particular light in response to switch operation.

Figure 14:
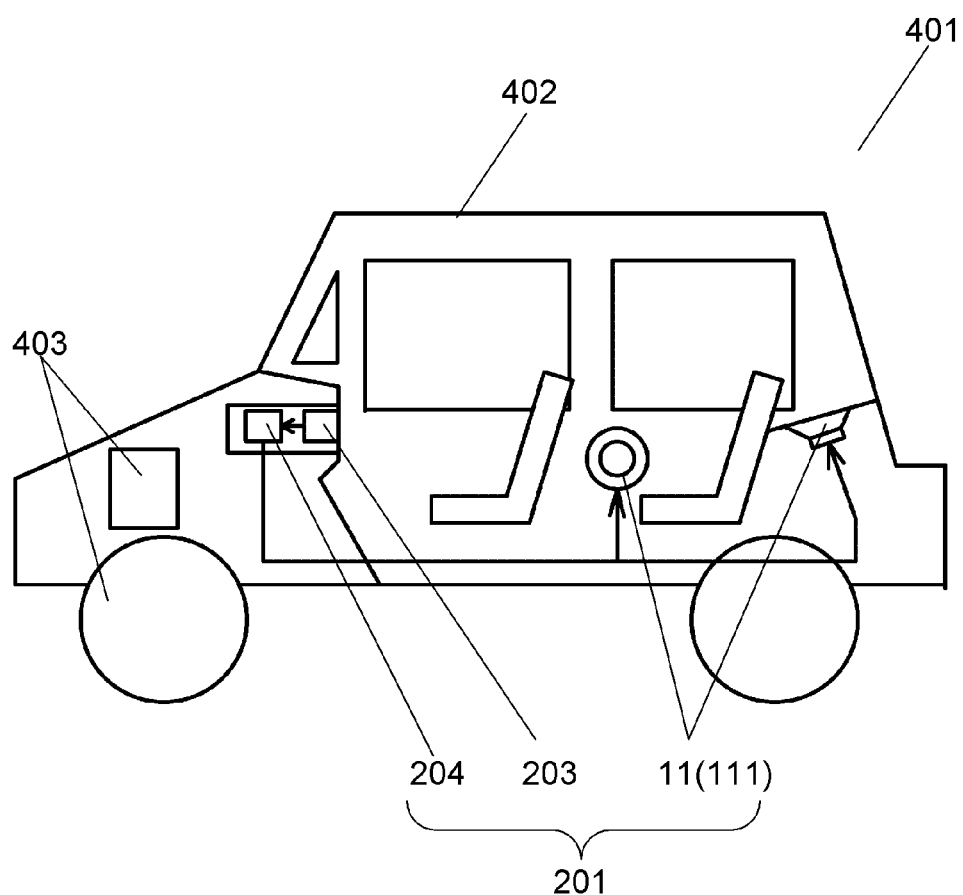
FIG. 14 is a conceptual diagram of a mobile apparatus according to the embodiment of the present invention.

FIG. 14 is a conceptual diagram of a mobile apparatus according to the embodiment. Mobile apparatus 401 is an automobile, for instance. Mobile apparatus 401 may be, besides an automobile, play apparatus (e.g., a go-cart and Ferris wheel), an aircraft, ship, motorbike, bicycle, and forklift, for example.

Mobile apparatus 401 includes body 402, drive unit 403, sound source unit 203, audio processor 204, and loudspeaker 11. Drive unit 403 includes either one of an engine or motor. Drive unit 403 may further include any type of control equipment such as a tire, screw, caterpillar, transmission, steering wheel, and accelerator. At least a part of drive unit 403, sound source unit 203, and audio processor 204 are accommodated in the body. Loudspeaker 11 is disposed at a position where a person on mobile apparatus 401 can hear sound, in body 402.

With the above configuration, a person on mobile apparatus 401 can enjoy sound as well as illumination produced from beautiful light patterns and images.

In a case where loudspeaker 11 is installed in a forklift, those who are around the forklift can recognize the access of the forklift with sound as well as light.

Further, in a case where loudspeaker 11 is installed in the outside of play equipment (e.g., a go-cart and Ferris wheel), not only those who are on board of the equipment but those who are not can enjoy the illumination.

Note that electronic apparatus 201, electronic apparatus 301, and mobile apparatus 401 may employ loudspeaker 111 instead of loudspeaker 11.

INDUSTRIAL APPLICABILITY

A loudspeaker according to the present invention has an advantage of providing decoration by illumination produced from beautiful light patterns and images and is useful as a loudspeaker used for an electronic apparatus and a mobile apparatus.

REFERENCE MARKS IN THE DRAWINGS 11 loudspeaker
12 frame
13 magnetic circuit
13A yoke
13B magnet
13C plate
13D magnetic gap
14 diaphragm
14A light guide
14B end face
14C inner circumferential end
14D reflecting surface
14E plate-shaped projection
14F resin coating film
14G projection
14H edge
15 voice coil bobbin
15A light inlet window
15B transmissive material
15C through hole
18A light collection lens
19 dust cap
20 spacer
21 wiring part
21A printed circuit board
21B lead wire
22 external terminal
111 loudspeaker
114 diaphragm
114B end face
114C inner circumferential end
114D recess
201 electronic apparatus
202 housing
203 sound source unit
204 audio processor
301 electronic apparatus
301A body
301B game board
401 mobile apparatus

The invention claimed is:
1. A loudspeaker comprising:
a light-emitting element;
a frame;
a magnetic circuit joined to the frame and provided with a magnetic gap;

a diaphragm including an inner circumferential end including an end face facing the light-emitting element, and a light guide having a reflecting surface and provided at a position where light enters from the end face;

a cylindrical voice coil bobbin having a first end joined to the inner circumferential end, a second end inserted into the magnetic gap; and a voice coil wound around the second end of the voice coil bobbin.

2. The loudspeaker according to claim 1, wherein the light-emitting element is disposed at an inside of the voice coil bobbin.

3. The loudspeaker according to claim 2, wherein the end face is joined to an outer circumferential surface of the voice coil bobbin.

4. The loudspeaker according to claim 3, wherein the end face is shaped along the outer circumferential surface of the voice coil bobbin.

5. The loudspeaker according to claim 3, further comprising a bonding part joining a part of the inner circumferential end excluding the end face with the voice coil bobbin.

6. The loudspeaker according to claim 3, wherein the voice coil bobbin is made of a transmissive material.

7. The loudspeaker according to claim 3, wherein the voice coil bobbin has a light inlet window penetrating the voice coil bobbin and allowing the light to enter the end face of the diaphragm.

8. The loudspeaker according to claim 2, wherein the inner circumferential end of the diaphragm projects to the inside of the voice coil bobbin.

9. The loudspeaker according to claim 8, wherein the first end of the voice coil bobbin has a bending part joined with the diaphragm.

10. The loudspeaker according to claim 9, wherein the bending part bends to an outside of the voice coil bobbin.

11. The loudspeaker according to claim 8, wherein the first end of the voice coil bobbin is provided with a cutout through which the inner circumferential end of the diaphragm penetrates.

12. The loudspeaker according to claim 8, wherein the diaphragm has a projection joined with at least one of an outer circumferential surface and an inner circumferential surface of the voice coil bobbin.

13. The loudspeaker according to claim 1, wherein the inner circumferential end of the diaphragm is bent along the inner circumferential surface or an outer circumferential surface of the voice coil bobbin.

14. The loudspeaker according to claim 13,
wherein the first end of the voice coil bobbin bends outward, and
the inner circumferential end of the diaphragm is bent along the outer circumferential surface of the voice coil bobbin and is joined with the voice coil bobbin.

15. The loudspeaker according to claim 1, wherein the inner circumferential end of the diaphragm is thicker than the light guide.

16. The loudspeaker according to claim 1, wherein the reflecting surface of the diaphragm has a plate-shaped projection.

17. An electronic apparatus comprising:
a sound source unit configured to output a sound source signal;
an audio processor electrically connected with output from the sound source unit; and
the loudspeaker according to claim 1 electrically connected with output from the audio processor.

18. A mobile apparatus comprising:
a body;
a drive unit provided inside the body;
a sound source unit accommodated in the body and configured to output a sound source signal;
an audio processor electrically connected with output from the sound source unit; and
the loudspeaker according to claim 1 attached to the body, and electrically connected with output from the audio processor.

* * * * *